US011111350B2

(12) United States Patent
Harfmann

(10) Patent No.: US 11,111,350 B2
(45) Date of Patent: Sep. 7, 2021

(54) METHOD FOR PRODUCTION OF LOW DENSITY POLYESTER FOAM AND ARTICLES MADE THEREOF UTILIZING LOW I.V. POLYESTER FEEDSTOCK

(71) Applicant: Walter R. Harfmann, Matthews, NC (US)

(72) Inventor: Walter R. Harfmann, Matthews, NC (US)

(73) Assignee: WRH TECHNOLOGY, LLC, Matthews, NC (US)

( * ) Notice: Subject to any disclaimer, the term of this patent is extended or adjusted under 35 U.S.C. 154(b) by 452 days.

(21) Appl. No.: 16/167,508

(22) Filed: Oct. 22, 2018

(65) Prior Publication Data

US 2019/0127543 A1    May 2, 2019

Related U.S. Application Data

(60) Provisional application No. 62/707,259, filed on Oct. 26, 2017.

(51) Int. Cl.
*C08J 9/00* (2006.01)
*C08J 11/10* (2006.01)
(Continued)

(52) U.S. Cl.
CPC ............ *C08J 9/0061* (2013.01); *B29B 11/10* (2013.01); *B29C 44/00* (2013.01); *B29C 51/002* (2013.01); *B29C 51/02* (2013.01); *C08J 3/203* (2013.01); *C08J 3/24* (2013.01); *C08J 9/36* (2013.01); *C08J 11/10* (2013.01); *C08L 101/00* (2013.01); *B29K 2067/00* (2013.01);

(Continued)

(58) Field of Classification Search
CPC ..................................... C08J 9/0061
See application file for complete search history.

(56) References Cited

U.S. PATENT DOCUMENTS 3,058,159 A    10/1962  Ishizuka et al.
3,211,678 A    10/1965  Robinson
(Continued)

FOREIGN PATENT DOCUMENTS

WO    WO 2007/067421 A2    6/2007

OTHER PUBLICATIONS

International Search Report and Written Opinion dated Feb. 5, 2019 for corresponding International Application No. PCT/US2018/057938.

*Primary Examiner* — Larry W Thrower
(74) *Attorney, Agent, or Firm* — Jeffrey Watson; Mathew Grell; Grell & Watson Patent Attorneys LLC

(57) ABSTRACT

A method for producing low density polyester foam utilizing low I.V. polyester feedstock includes providing a low intrinsic viscosity raw material. The low intrinsic viscosity raw material includes between 25% to 100% of a post consumer polyester and has an intrinsic viscosity of less than 0.8 dl/g. The intrinsic viscosity of the low intrinsic viscosity raw material is increased via a de-condensation reaction configured to support foaming. The intrinsic viscosity of the low intrinsic viscosity raw material is increased to 1.1 dl/g or greater. A starting formulation is created including the low intrinsic viscosity raw material with the increased intrinsic viscosity. The starting formulation is foamed to create the polyester foam. Wherein, the polyester foam produced has a specific gravity of less than 0.65 g/cc.

16 Claims, 2 Drawing Sheets

(51) Int. Cl.
*C08J 3/20* (2006.01)
*C08J 3/24* (2006.01)
*B29B 11/10* (2006.01)
*B29C 51/02* (2006.01)
*B29C 51/00* (2006.01)
*C08J 9/36* (2006.01)
*C08L 101/00* (2006.01)
*B29C 44/00* (2006.01)
*C08J 9/14* (2006.01)
*B29K 105/04* (2006.01)
*B29K 67/00* (2006.01)

(52) U.S. Cl.
CPC ........... *B29K 2105/04* (2013.01); *C08J 9/141* (2013.01); *C08J 2201/03* (2013.01); *C08J 2203/14* (2013.01); *C08J 2203/182* (2013.01); *C08J 2300/30* (2013.01); *C08J 2367/00* (2013.01); *C08J 2400/30* (2013.01); *C08J 2467/00* (2013.01)

(56) References Cited

U.S. PATENT DOCUMENTS

| | | |
|---|---|---|
| 4,314,928 A | 2/1982 | Bier et al. |
| 5,176,861 A | 1/1993 | Ishikawa |
| 5,362,765 A | 11/1994 | Taka et al. |
| 6,025,405 A | 2/2000 | Tung et al. |
| 6,080,824 A | 6/2000 | Tung et al. |
| 6,100,307 A | 8/2000 | Tung et al. |
| 6,130,261 A | 10/2000 | Harfmann |
| 6,214,897 B1 | 4/2001 | Tung et al. |
| 6,284,808 B1 | 9/2001 | Robinson et al. |
| 6,841,106 B1 | 1/2005 | Fujimaki et al. |
| 7,828,538 B2 | 11/2010 | Fellinger |
| 8,575,270 B2 | 11/2013 | Kuo et al. |
| 9,321,888 B2 | 4/2016 | Kukalyekar et al. |
| 9,376,535 B2 | 6/2016 | Kukalyekar et al. |
| 2003/0135015 A1 | 7/2003 | Fujimaki et al. |
| 2004/0254332 A1 | 12/2004 | Hayes |
| 2014/0227506 A1 | 8/2014 | Kuwabara et al. |

# METHOD FOR PRODUCTION OF LOW DENSITY POLYESTER FOAM AND ARTICLES MADE THEREOF UTILIZING LOW I.V. POLYESTER FEEDSTOCK

CROSS-REFERENCE TO RELATED APPLICATIONS

This application claims benefit of priority application, U.S. Provisional Ser. No. 62/707,259 filed on Oct. 26, 2017 entitled "Method for Production of Low Density Polyester Foam and Articles Made Thereof Utilizing Low I.V. Polyester Feedstock", which is incorporated herein by reference in its entirety.

FIELD OF THE DISCLOSURE

The present disclosure relates to low density polyester foam. More specifically, the present disclosure is directed toward low density polyester foam utilizing low Intrinsic Viscosity (I.V.) polyester feedstock, methods for production thereof, and articles made thereof.

BACKGROUND

Foam is a substance formed by trapping pockets of gas in a liquid or solid. Solid foams can be closed-cell or open-cell. In closed-cell foam, the gas forms discrete pockets, each completely surrounded by the solid material. In open-cell foam, gas pockets connect to each other. A bath sponge is an example of an open-cell foam, where water easily flows through the entire structure, displacing the air. A camping mat is an example of a closed-cell foam, where gas pockets are sealed from each other so the mat cannot soak up water. Foam can refer to many different variations of foam material, such as quantum foam, polyurethane foam (foam rubber), XPS foam, polystyrene, phenolic, or many other manufactured types of foam. As used herein, foam may refer to polyester foam, namely, low density polyester foam.

Low density polyester foam may have significant advantages over many other materials due to the low weight of articles achieved by foaming, large thermal window of performance, and inherent toughness of the material. However, the high specific gravity of the material results in a part weight increase which, along with resin cost has placed this material at a cost disadvantage to other materials. As a result, low density polyester foam has remained largely unused commercially. For example, while an excellent alternative to polystyrene foam containers, the cost has remained too high to be competitive.

The disclosure recognizes that by using lower cost polyester resin of lower intrinsic viscosity (I.V.), as measured by ASTM method D-4603, specifically post-consumer resins, the cost disadvantage of polyester foams may be abated, thereby, making these polyester foams a viable commercial product. But, prior to the disclosure, polyester resin of low intrinsic viscosity is unsuited for producing PET foam.

During the 1990's, a concerted effort was made to commercialize low density polyester foam. (Low density here is defined as having a specific gravity of less than 0.65 g/cc.) Hussain Al Ghatta of the Massi Ghisolfi Group of Italy (see U.S. Pat. No. 5,422,381, incorporated herein in its entirety), produced a foam grade polyester resin. He determined that a linear polyester required an I.V. of approximately 1.2 dl/g to produce the melt strength needed to foam polyester to low density. DuPont, Musciatti (see U.S. Pat. No. 5,391,582, incorporated herein in its entirety), simultaneously developed a foam grade of PET with an I.V. of 0.95 dl/g, but their resin was highly branched. Eastman produced a foaming system wherein a standard virgin PET of I.V. of 0.80 dl/g would be used and reactively the I.V. would be increased in the extrusion process via a cross linking additive. This additive was patented by Eastman, Boone, et. Al. (see U.S. Pat. No. 5,696,176, incorporated herein in its entirety), Amoco, Rotter, et. Al. (see U.S. Pat. Nos. 5,340,846 and 5,288,764, incorporated herein in their entireties) and others.

Once these resins became available, additional research by Shell Chemical, Johnston, et. Al. (see U.S. Pat. No. 5,431,972, incorporated herein in its entirety) produced a functional nucleator. Work at Genpak, Hartmann (see U.S. Pat. No. 5,679,295, incorporated herein in its entirety), developed and patented functional blowing agent systems. With additional process development, Genpak commercialized low density PET foam.

While a technical success, the product that Genpak commercialized was a commercial failure. The target market was ovenable trays, an alternative to solid, crystallized PET trays (CPET). While functional, the insulative properties of the foam slowed both heating and cooling times offsetting the financial incentive of a lower cost product. The product was discontinued not long after entering the market and no significant effort has since been made to commercialize low density PET foam in food packaging.

To successfully compete in the market on other applications than the one listed above, the cost of the product must be reduced. Because of the high specific gravity of the resin itself and the inability to reach extremely low specific gravity (less than 0.08 g/cc) such as is possible with polystyrene, there is an inherent weight increase and therefore financial penalty in using PET foam.

Previous attempts to produce foam required the use of a high I.V. resin that sold at a premium or a virgin resin with I.V. above 0.8 dl/g along with a crosslinking additive to produce said foam. A need exists for a lower cost raw material alternative in manufacturing low density PET foam.

The disclosure is designed to address at least certain aspects of the problems or needs discussed above by providing a method for production of low density polyester foam and article made thereof utilizing low I.V. polyester feedstock.

SUMMARY

Accordingly, in one aspect, the present disclosure embraces a method of producing low density polyester foam utilizing low I.V. polyester feedstock. The method of producing low density polyester foam utilizing low I.V. polyester feedstock may generally include providing a low intrinsic viscosity raw material. The low intrinsic viscosity raw material may include between 25% to 100% of a post consumer polyester. The low intrinsic viscosity raw material provided may have an intrinsic viscosity of less than 0.8 dl/g. The intrinsic viscosity of the low intrinsic viscosity raw material may be increased via a de-condensation reaction configured to support foaming. The intrinsic viscosity of the low intrinsic viscosity raw material may be increased to 1.1 dl/g or greater. A starting formulation may be created including the low intrinsic viscosity raw material with the increased intrinsic viscosity. The starting formulation may be foamed to create the polyester foam. Wherein, the polyester foam produced may have a specific gravity of less than 0.65 g/cc.

In select embodiments, the method for producing polyester foam may further include crystallizing the low intrinsic viscosity raw material in a crystallizer. In an alternative embodiment, the method for producing polyester foam may further include pelletizing the low intrinsic viscosity raw material. The crystallizing or the pelletizing may be configured to prevent the low intrinsic viscosity raw material from melting during the de-condensation reaction.

In other select embodiments of the method for producing polyester foam, the low intrinsic viscosity raw material may include virgin polyester, the post consumer polyester may be a polyester feedstock that consists of post-industrial waste resin, and process regrind. In select embodiments, the post-industrial waste resin of the low intrinsic viscosity raw material may consist of post-consumer scrap bottle flake.

In select embodiments of the method for producing polyester foam, increasing the viscosity of the low intrinsic viscosity raw material via a de-condensation reaction to support foaming may include increasing the molecular weight of the low intrinsic viscosity raw material. In select embodiments, the molecular weight of the low intrinsic viscosity raw material may be increased by feeding the low intrinsic viscosity raw material into a solid-state reactor. In other select embodiments, the molecular weight of the low intrinsic viscosity raw material may be increased by a melt-phase de-condensation reaction with vacuum using a melt phase reactor.

In select embodiments of the method for producing polyester foam, creating of the starting formulation may include adding a viscosity enhancing agent and/or a nucleating agent. The viscosity enhancing agent may be configured to fine tune the viscosity of the low intrinsic viscosity raw material. The nucleating agent may be configured for aiding in nucleating the low intrinsic viscosity raw material. In select embodiments, the viscosity enhancing agent may be a cross-linking agent. In other select embodiments, the nucleating agent may consist of a poly-flouro-ethylene particle.

In select embodiments of the method for producing polyester foam, foaming of the starting formulation to create the polyester foam may include tandem extrusion of the starting formulation to create the polyester foam. The tandem extrusion of the starting formulation to create the polyester foam may include a primary twin screw extruder and a secondary cooling extruder. The primary twin screw extruder may include an injection system and a blowing agent storage system configured to introduce a blowing agent into the starting formulation once the starting formulation is melted and mixed via the primary twin screw extruder. A homogenous mixture of the starting formulation with the blowing agent injected therein may exit the primary twin screw extruder. The secondary cooling extruder may be configured to cool the homogenous mixture that exits the primary twin screw extruder for giving the necessary rheology needed to the homogenous solution for successful foaming. The secondary cooling extruder may be configured to give heat exchange with minimal shear heat generation. The secondary cooling extruder may include a screw configured to act as a heat exchanger for removing heat from the homogenous mixture and increasing viscosity. In select embodiments, a screen changer between the primary twin screw extruder and the secondary cooling extruder may be included. The screen changer may be configured to screen for solid impurities. In select embodiments, a gear pump may be between the primary twin screw extruder and the secondary cooling extruder. The gear pump may be configured to pressurize the homogenous mixture exiting the primary twin screw extruder and to impart minimal additional shear heat while wiping and renewing a surface contact of the homogenous mixture. In select embodiments, the blowing agent may consist of a hydrocarbon. The hydrocarbon of the blowing agent may be, but is clearly not limited thereto, C5 hydrocarbons, C6 hydrocarbons, the like, etc.

In select embodiment, the method for producing polyester foam may further include using a die to form the polyester foam. The die may be any desired type, size or shape of die, including, but not limited to, a board die or a sheet die. The die may be configured with associated finishing equipment. As an example, and clearly not limited thereto, the associated finishing equipment for the die may include a sizing drum, a pull unit, and a winder to produce a roll. The pull unit may be configured to pull a bubble of the polyester foam over the sizing drum and slit the bubble to open a flat sheet. In select embodiments, the polyester foam may be produced as the flat sheet in a roll stock form to a thickness of at least 0.040 inches and of up to 0.375 inches thick. In other select embodiments, the polyester foam may be produced with the thicknesses greater than 0.5 inches and widths of greater than 6 inches. As examples, and clearly not limited thereto, the flat sheet may be used as a thermal barrier, the polyester foam may be utilized as a wood or equivalent substitute, the like, or combinations thereof.

In other select embodiments, the flat sheet may be thermoformed into useful articles. The useful articles may include, but are clearly not limited thereto, clamshells, meat trays, plates, bowls, the like, etc. In select embodiments, the flat sheet may be thermoformed into useful articles via: unwinding the roll of flat sheet of the polyester foam; heating the unwinded roll of flat sheet in an oven, where temperatures of the oven are controlled to soften but not melt the flat sheet of polyester foam; forming the heated flat sheet of polyester foam in a forming station, where the heated flat sheet of polyester foam is amorphous or crystallized when formed; cutting the formed flat sheet of polyester foam in a trim press, where skeletal waste or regrind is stored to be reused; and packaging the useful articles for sale.

In another aspect, the disclosure embraces a useful article made of polyester foam. The useful article disclosed herein may generally be made by any of the various embodiments of the method of producing polyester foam as shown and/or described herein. As a result, the useful article may include a low intrinsic viscosity raw material. The low intrinsic viscosity raw material may include between 25% to 100% of a post consumer polyester. The low intrinsic viscosity raw material provided may have an intrinsic viscosity of less than 0.8 dl/g. The intrinsic viscosity of the low intrinsic viscosity raw material may be increased to 1.1 dl/g or greater to support foaming. The low intrinsic viscosity raw material may include virgin polyester, the post consumer polyester may be a polyester feedstock that consists of post-industrial waste resin, and/or process regrind. In select embodiments, the post-industrial waste resin of the low intrinsic viscosity raw material may consist of post-consumer scrap bottle flake. With this low intrinsic viscosity raw material of the useful article made of polyester foam, a starting material may be included with the low intrinsic viscosity raw material with the increased intrinsic viscosity, a viscosity enhancing agent configured to fine tune the viscosity of the low intrinsic viscosity raw material, and a nucleating agent configured for aiding in nucleating the low intrinsic viscosity raw material. Wherein, the polyester foam of the useful article may have a specific gravity of less than 0.65 g/cc.

In select embodiments of the useful article made of polyester foam, the polyester foam may be produced with the thicknesses greater than 0.5 inches and widths of greater than 6 inches.

In other select embodiments of the useful article made of polyester foam, the polyester foam may be produced as the flat sheet in a roll stock form to a thickness of at least 0.040 inches and of up to 0.375 inches thick.

In other select embodiments of the useful article made of polyester foam, the flat sheet may be used as a thermal barrier.

In other select embodiments of the useful article made of polyester foam, the flat sheet may be utilized as a wood or equivalent substitute.

In other select embodiments of the useful article made of polyester foam, the flat sheet may be thermoformed into the useful articles. Examples of such thermoformed useful articles may include, but are clearly not limited thereto, clamshells, meat trays, plates, bowls, the like, etc.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
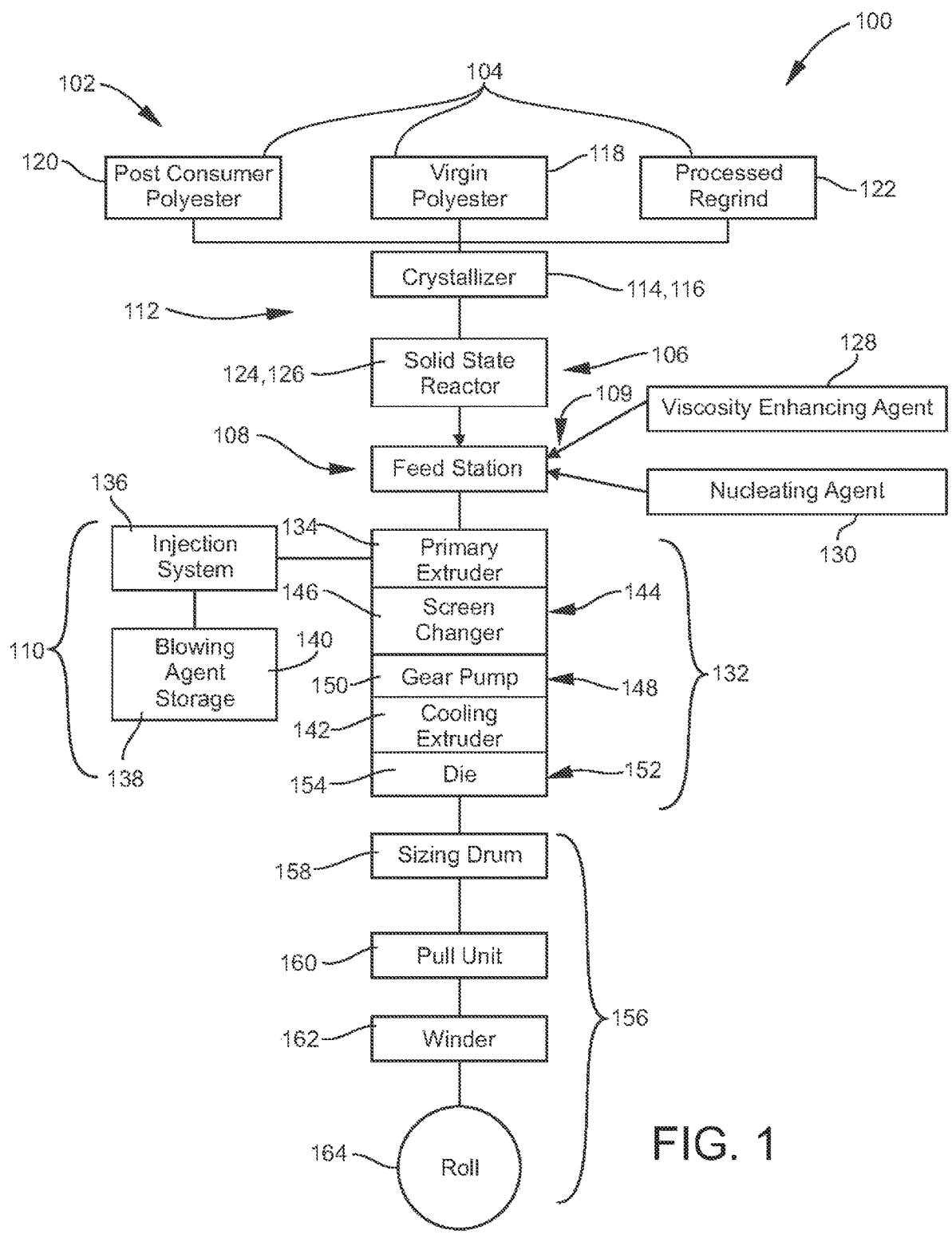
FIG. 1 is a flow diagram of the method for producing low density polyester foam utilizing low I.V. polyester feedstock according to select embodiments of the disclosure.
Figure 2:
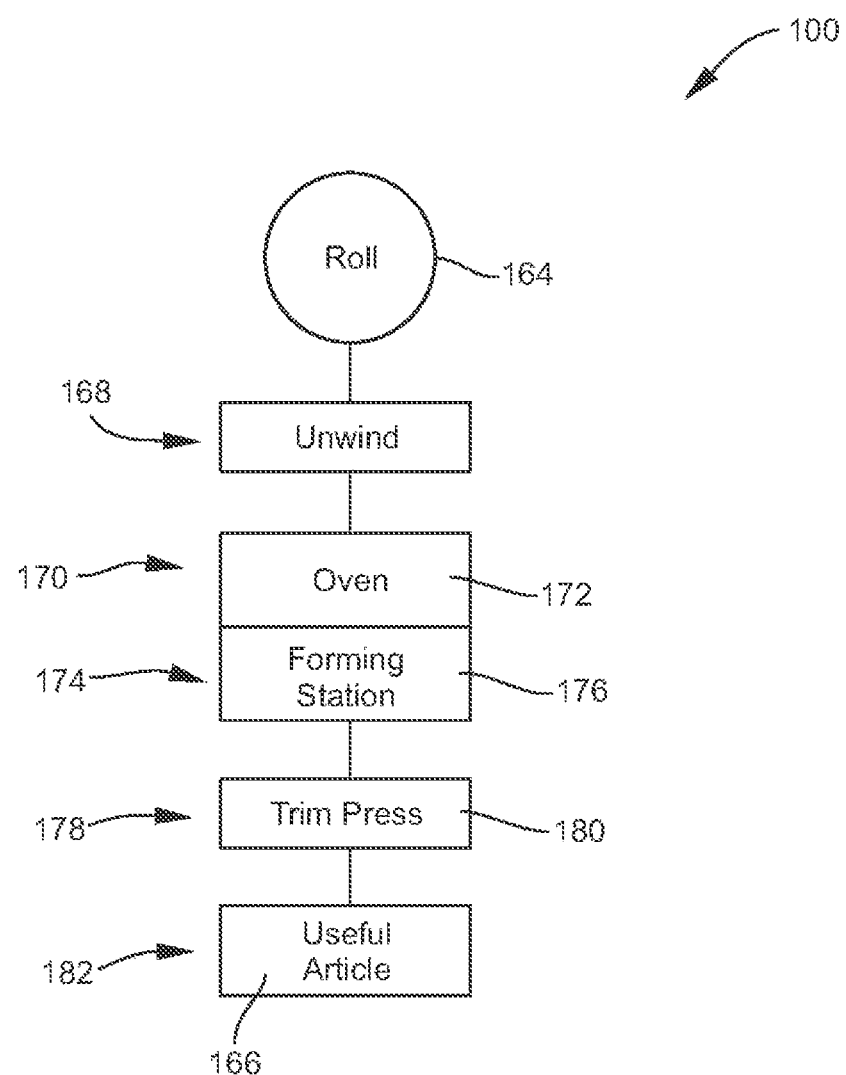
FIG. 2 is a flow diagram of the method for thermoforming the produced polyester foam sheet into thermoformed articles according to select embodiments of the disclosure.

Referring now to FIGS. 1-2, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-2, in a possibly preferred embodiment, the present disclosure overcomes the above-mentioned disadvantages and meets the recognized need for such an apparatus or method by providing of method 100 of producing low density polyester foam utilizing low I.V. polyester feedstock 104. Method 100 of producing low density polyester foam utilizing low I.V. polyester feedstock 104 may generally include step 102 of providing low intrinsic viscosity raw material 104. Low intrinsic viscosity raw material 104 may include between 25% to 100% of post consumer polyester 120. Low intrinsic viscosity raw material 104 provided may have an intrinsic viscosity of less than 0.8 dl/g. The intrinsic viscosity of the low intrinsic viscosity raw material 104 may be increased in step 106 via a de-condensation reaction configured to support foaming step 110. The intrinsic viscosity of the low intrinsic viscosity raw material may be increased to 1.1 dl/g or greater in step 106. Starting formulation 109 may be created in step 108. Step 108 of creating starting formulation 109 may include low intrinsic viscosity raw material 104 with the increased intrinsic viscosity. Starting formulation 109 may be foamed to create the polyester foam in step 110. Wherein, the polyester foam produced via method 100 may have a specific gravity of less than 0.65 g/cc.

The low intrinsic viscosity raw material 104 may include any types of polyester materials. In select, possibly preferred embodiments, low intrinsic viscosity raw material may include virgin polyester 118, post consumer polyester 120, and process regrind 122. See FIG. 1. Post consumer polyester 120 may be any types of recycled or reusable polyester materials. In select possibly preferred embodiments, post consumer polyester 120 may be polyester feedstock that consists of post-industrial waste resin. In select possibly most preferred embodiments, the post-industrial waste resin of the low intrinsic viscosity raw material 104 may consist of post-consumer scrap bottle flake. Flake, as used herein, may refer to a particle having a length, width and thickness, wherein the thickness is less than 20% of the smaller dimension of length or width. As such, a flake as used herein may be a particle with significant surface area to volume ratio.

Crystallizing the low intrinsic viscosity raw material 104 in crystallizer 114 may be included in select embodiments of method 100 for producing polyester foam in step 112. See FIG. 1. In an alternative embodiment, method 100 may include pelletizing the low intrinsic viscosity raw material in step 116. The crystallizing or the pelletizing steps 112 or 116, respectively, may be configured to prevent the low intrinsic viscosity raw material 104 from melting during the de-condensation reaction in step 106.

Step 106 of increasing the viscosity of low intrinsic viscosity raw material 104 may be included in method 100. See FIG. 1. Step 106 of increasing the viscosity of low intrinsic viscosity raw material 104 via the de-condensation reaction to support foaming may include increasing the molecular weight of the low intrinsic viscosity raw material 104. Step 106 of increasing the viscosity of the low intrinsic viscosity raw material 104 via the de-condensation reaction may include any various processes or apparatuses for increasing the viscosity of low intrinsic viscosity raw material 104 by increasing the molecular weight, including any processes or apparatuses currently known and/or discovered in the future. In select embodiments, the molecular weight of low intrinsic viscosity raw material 104 may be increased in step 106 by feeding the low intrinsic viscosity raw material into solid-state reactor 124. In other select embodiments, the molecular weight of the low intrinsic viscosity raw material may be increased in step 106 by a melt-phase de-condensation reaction with vacuum using melt phase reactor 126.

Step 108 of creating starting formulation 109 may be included in method 100. See FIG. 1. Step 108 of creating starting formulation 109 may include any processes or apparatuses for creating starting formulation 109, including any processes or apparatuses currently known and/or discovered in the future. In select embodiments, step 108 of creating of starting formulation 109 in method 100 may include adding viscosity enhancing agent 128 and/or nucleating agent 130. Viscosity enhancing agent 128 may be configured to fine tune the viscosity of the low intrinsic viscosity raw material 104. In select embodiments, viscosity enhancing agent 128 may be a cross-linking agent. Nucleating agent 130 may be configured for aiding in nucleating low intrinsic viscosity raw material 104. In select embodiments, the nucleating agent 130 may be configured to control bubble or cell size. In other select embodiments, nucleating agent 130 may consist of a poly-flouro-ethylene particle.

Step 110 of foaming of starting formulation 109 may be included in in method 100. See FIG. 1. Step 110 of foaming may be to create the polyester foam. Step 110 may include any processes or apparatuses for creating the polyester foam including any processes or apparatuses currently known and/or discovered in the future. In select embodiments, step 110 of foaming of starting formulation 109 may include tandem extrusion 132 of starting formulation 109 to create the polyester foam. Step 132 of tandem extrusion of starting formulation 109 may be to create the polyester foam and may include the use of primary twin screw extruder 134 and secondary cooling extruder 142. Primary twin screw extruder 134 may include injection system 136 and blowing agent storage system 138 configured to introduce blowing agent 140 into starting formulation 109 once starting formulation 109 is melted and mixed via primary twin screw extruder 134. In select embodiments, blowing agent 140 may consist of a hydrocarbon. The hydrocarbon of the blowing agent may be, but is clearly not limited thereto, C5 hydrocarbons, C6 hydrocarbons, the like, etc. Whereby, a homogenous mixture may exit primary twin screw extruder 134. Secondary cooling extruder 142 may be configured to cool the homogenous mixture that exits primary twin screw extruder 134 for giving the necessary rheology needed to the homogenous solution for successful foaming. Secondary cooling extruder 142 may be configured to give heat exchange with minimal shear heat generation. As such, in select embodiments, secondary cooling extruder 142 may include a screw configured to act as a heat exchanger for removing heat from the homogenous mixture and increasing viscosity. In select embodiments, screen changer 146 may be included between primary twin screw extruder 134 and secondary cooling extruder 142. Screen changer 146 may be configured for step 144 of screening for solid impurities. In select embodiments, gear pump 150 may be between primary twin screw extruder 134 and secondary cooling extruder 142. Gear pump 150 may be configured for step 148 of pressurizing the homogenous mixture exiting primary twin screw extruder 134 and to impart minimal additional shear heat while pressurizing.

Step 152 of forming the polyester foam may be included with method 100. See FIG. 1. Step 152 of forming the polyester foam may include any processes or apparatuses for forming the polyester foam including any currently known processes or apparatuses and/or any processes or apparatuses discovered in the future. In select embodiment, step 152 of forming the polyester foam in method 100 may include using die 154 to form the polyester foam. Die 154 may be any desired type, size or shape of die, including, but not limited to, a board die or a sheet die. Die 154 may be configured with associated finishing equipment 156. As an example and clearly not limited thereto, associated finishing equipment 156 for die 154 may include sizing drum 158, pull unit 160, winder 162, to produce roll 164. Pull unit 160 may be configured to pull a bubble of the polyester foam over sizing drum 158 and slit the bubble to open a flat sheet. In select embodiments, the polyester foam may be produced as the flat sheet in a roll stock form to a thickness of at least 0.040 inches and of up to 0.375 inches thick. In other select embodiments, the polyester foam may be produced with the thicknesses greater than 0.5 inches and widths of greater than 6 inches. As examples, and clearly not limited thereto, the flat sheet may be used as a thermal barrier, the polyester foam may be utilized as a wood or equivalent substitute, the like, or combinations thereof.

Referring now to FIG. 2, in other select embodiments of method 100 of producing low density polyester foam utilizing low I.V. polyester feedstock 104, the flat sheet may be thermoformed into useful articles 166. Useful articles 166 may include, but are clearly not limited thereto, clamshells, meat trays, plates, bowls, the like, etc. In select embodiments, the flat sheet may be thermoformed into useful articles via: step 168 of unwinding roll 164 of flat sheet of the polyester foam; step 170 of heating the unwinded roll of flat sheet in oven 172, where temperatures of the oven may be controlled to soften but not melt the flat sheet of polyester foam; step 174 of forming the heated flat sheet of polyester foam in forming station 176, where the heated flat sheet of polyester foam may be amorphous or crystallized when formed; step 178 of cutting the formed flat sheet of polyester foam in trim press 180, where skeletal waste or regrind is stored to be reused; and step 182 of packaging the useful articles 166 for sale.

In another aspect, the disclosure embraces useful article or articles 166 made of polyester foam. The useful article 166 disclosed herein may generally be made by any of the various embodiments of method 100 of producing polyester foam as shown and/or described herein. As a result, useful article 166 may include low intrinsic viscosity raw material 104. The low intrinsic viscosity raw material may include between 25% to 100% of post consumer polyester 120. Low intrinsic viscosity raw material 104 provided may have an intrinsic viscosity of less than 0.8 dl/g. The intrinsic viscosity of low intrinsic viscosity raw material 104 may be increased to 1.1 dl/g or greater to support foaming. Low intrinsic viscosity raw material 104 may include virgin polyester 118, post consumer polyester 120 that may be a polyester feedstock that consists of post-industrial waste resin, and process regrind 122. In select embodiments, the post-industrial waste resin of low intrinsic viscosity raw material 104 may consist of post-consumer scrap bottle flake, as disclosed and defined herein. With this low intrinsic viscosity raw material 104 of useful article 166 made of polyester foam, starting material 109 may be included with low intrinsic viscosity raw material 104 with the increased intrinsic viscosity, viscosity enhancing agent 128 may be included to fine tune the viscosity of low intrinsic viscosity raw material 14, and nucleating agent 130 may be included for aiding in nucleating low intrinsic viscosity raw material 104. Wherein, the polyester foam of useful article 166 may have a specific gravity of less than 0.65 g/cc.

In select embodiments of useful article 166 made of polyester foam, the polyester foam may be produced with the thicknesses greater than 0.5 inches and widths of greater than 6 inches.

In other select embodiments of useful article 166 made of polyester foam, the polyester foam may be produced as the flat sheet in a roll stock form to a thickness of at least 0.040 inches and of up to 0.375 inches thick.

In other select embodiments of useful article 166 made of polyester foam, the flat sheet may be used as a thermal barrier.

In other select embodiments of useful article 166 made of polyester foam, the flat sheet may be utilized as a wood or equivalent substitute.

In other select embodiments of useful article 166 made of polyester foam, the flat sheet may be thermoformed into the useful articles, as shown in FIG. 2. Examples of such thermoformed useful articles 166 may include, but are clearly not limited thereto, clamshells, meat trays, plates, bowls, the like, etc.

In sum, the disclosure may be directed toward increasing the melt strength of lower viscosity PET raw materials 104 to produce a low-density polyester foam. This method involves utilizing PET resins 104 with an I.V. of less than 0.8 dl/g and using solid state de-condensation to produce a foamable PET resin. Combined with prior developments in both nucleation and blowing agents, low density PET foam may be successfully produced, which may be utilized as extruded material, or be formed into useful articles 166 in a secondary operation. Specifically, method 100 may utilize a low I.V. polyester feedstock 104. This feedstock can be pelletized or used as flake. The feedstock I.V. may be increased to greater than 1.1 dl/g via solid state reactor 124. The material, now with an improved I.V., may be processed using tandem extrusion 132 to produce foam. An I.V. enhancer may be used to achieve optimal density reduction. Various die configurations may be used to make roll, boards, or other geometry useful for commercial applications.

As a starting material, the disclosure may utilize a lower I.V. virgin resin for low IV raw material 104, with post consumer polyester 120, which may be post-industrial or post-consumer PET resin available through recycling of bottles and other PET articles in recycle systems widely used across the country. Such materials are widely available and at considerably lower cost than the resins previously used for PET foam development. To produce a foam grade material, this material undergoes a de-condensation reaction with vacuum to increase the molecular weight either via solid-state reactor 124 such as is offered by Starlinger of Austria or by a melt phase de-condensation reaction with vacuum using melt phase reactor such as is offered by NGR of Austria.

Muschiatti (see U.S. Pat. No. 5,391,582, incorporated herein in its entirety) disclosed use of post-consumer polyester as well, but this was never reduced to practice. Muschiatti used a chain extender to make foamable resin, but I.V. is not linear and large amounts of enhancer are needed to achieve an I.V. of 1.2 dl/g. This can result in uneven reactions yielding a lumpy extrudate unable to be uniformly formed. By first increasing the I.V. by solid state de-condensation, foam can be made with little or no enhancer. This results in a uniform and stable extrudate.

Depending on other needs, this material is combined with 0% to 75% virgin PET polyester resin 118 and extruded to produce low density foam. The foaming technology of choice may be tandem extrusion 132 which is well known in the industry with the primary extruder 134 preferably consisting of a twin rather than single screw extruder. This is advantageous for mixing and reducing loss of I.V. due to shear. The secondary extruder 142 may typically be a single screw extruder configured to give heat exchange with minimal shear heat generation but any type of polymer heat exchanger can be used. Typical blowing agents 140 may consist of hydrocarbons as well as hydro-chloro-flourocarbons. Poly-flouro-ethylene particles have been found to be effective nucleators for cell size control.

In addition, a cross-linking agent can be used to fine tune the viscosity as viscosity enhancing agent 128. Polyester foam will collapse if the viscosity is too low, but becomes non-uniform (lumpy) and unusable if the viscosity becomes too high or is uneven. As such, control is best maintained by using the de-condensation reaction with vacuum to attain an I.V. of greater than 1.1 dl/g and then add a cross linking agent to fine tune the formulation to optional performance. Such agents are commercially available from companies such as Sukano S606-HP.

A board or sheet die 154 can be used with the correct associated finishing equipment 156. Utilizing such a system, PET foam can be produced at less than 0.65 g/cc, a reduction in density of at least 50% from the base resin. This foam may be used for large cross-section applications, such as marine board, or can be made into roll-stock for the production of thermoformed articles 166, as shown and described in FIG. 2.

Referring now specifically back to FIG. 1, virgin Polyester 118, post consumer polyester 120, and process regrind 122 in any proportions may be first crystallized to prevent material from melting during solid state de-condensation. This blend may then be fed into solid-state de-condensation reactor 124 where the I.V. may be increased to greater than a 1.1 dl/g intrinsic viscosity. Alternately, this blend may first be pelletized before the solid-state de-condensation reaction.

The polyester resin, now of high I.V. may be conveyed to a feed system where it is combined in proper proportions with viscosity enhancing additive 128 and nucleating agent 130. This mixture may be fed into primary extruder 134.

In a separate operation, blowing agent 140 may feed a metering system that is injected into primary extruder 134.

Primary extruder 134 may first melt and mix the solid components. Once melted, blowing agent 140 may be injected and mixed such that a homogenous mixture exits primary extruder 134. The melt is subsequently screened for solid impurities that can get caught in die 154, pressurized utilizes gear pump 150, and then cooled in secondary cooling extruder 142. This secondary cooling extruder 142 may be designed with a screw to act as a heat exchanger removing heat from the melt and increasing the viscosity for optimal foam expansion out of die 154.

To produce thermoformed articles 166, roll stock may be made by pulling a bubble over sizing drum 158 and slitting the bubble to open a flat sheet. Pull unit 160 may ensure uniform gauge with the resulting material wound into roll form on winder 162. Rolls 164 can then be used as is or further processed by thermoforming.

Referring now specifically back to FIG. 2, FIG. 2 depicts a thermoforming operation wherein roll 164, such as produced via the process of FIG. 1, may be placed on unwind 168 that feeds the material into oven 172. The oven temperatures are carefully controlled to soften but not melt the polyester foam material. This softened material is then formed. The material may be amorphous or crystallized when formed. The formed items may be cut out in trim press 180. The skeletal waste or regrind may be stored to be reused in method 100 of FIG. 1. Useful articles 166 may then be packaged for sale.

In a possibly preferred embodiment, as an example, and clearly not limited thereto, polyester foam can be created utilizing method 100 disclosed herein using post-consumer polyester bottle flake. The post-consumer polyester bottle flake be washed and cleaned, and may have a nominal intrinsic viscosity of 0.7 dl/g. The post-consumer polyester bottle flake may be first crystallized using a Starlinger crystallizer. This material can then be processed using a Starlinger ViscoSTAR solid state Polycondensation Plant to an intrinsic viscosity of 1.1 dl/g or more.

A mixture of 25% virgin polyester having an intrinsic viscosity of 0.8 dl/g and 72% of the improved bottle flake may be gravimetrically fed into a twin screw extruder. A chain extender additive, such as pyromellitic-di-anhydride, may also be added at about a ½% level to build the desired final viscosity. This additional level may vary based on the temperature of the melt as well as the blowing agent composition. Typically, experience indicates the amount needed based on the motor amps of the secondary extruder, which may serve as a defacto viscometer.

After the melt is plasticated, a melt seal may be provided in the screw design. After this seal, under high pressure, the blowing agent may be injected. Cyclo-pentane may be added at about 2%, for optimal foaming. The level added can, however, vary based on the requirements of the product. The remainder of the twin screw extruder may be designed to mix and homogenize the composition.

The homogenous melt may exit the twin screw extruder and flow through a screen changer which may filter out any unwanted particles. The melt, typically at a temperature of 560° F. and a pressure of 1,500 psi, may enter the gear pump which may increase the pressure to about 2,500 psi. The gear pump may be sized to impart minimal additional shear heat.

On exiting the gear pump, the melt may enter the secondary or cooling extruder 142. The screw may be designed to impart minimal shear heat while wiping and renewing the surface contact of the melt with the barrel. The barrel may be oil cooled to avoid the thermal shock that can accompany heat of vaporization. The purpose of the secondary extruder may be to reduce the melt temperature from about 560° F. to between about 490° F. and 520° F., which may give the necessary rheology needed for successful foaming.

The tempered melt may exit the extrusion line through an annular die and may pass over a cooling drum which may freeze the foam in place. A pull unit and winder may collect the product in the form of rolls.

The rolls can be used directly or formed in a secondary operation into useful articles. For example, but clearly not limited thereto, one such article may be a meat tray. Using a thermoformer, such as an Irwin Model 50, and the appropriate tooling, such articles can be produced. Typical conditions for the former may include an oven temperature of about 600° F. with a cycle speed of 25 cycles per minute. The formed shape may be trimmed in a punch and die trim station and the part may then be packaged for sale.

While this may be the preferred embodiment of the invention, it is understood that other processes that reasonably meet the criteria of equivalence are also included within the scope of this invention as are products made from the resulting foam produced.

EXAMPLE 1

With this first example, polyester foam was created utilizing method 100 disclosed herein according to select possibly preferred embodiments. Primatop GP-80 virgin polyester resin with a measured I.V. of 0.85 di/gram was loaded into a Starlinger SSP solid state reactor. Approximately 6,000 pounds of material were loaded into the reactor.

The reactor was set at a temperature of 212° C. with a purge of 2,100 liters per hour of nitrogen. The material was held in the reactor for a period of 25 hours. After this time, the material was unloaded and allowed to cool. The resulting material was measured for intrinsic viscosity. The results ranged from 1.30 di/gram to 1.35 di/gram. Prior art has shown this level of intrinsic viscosity may be suitable for low density foaming applications, as shown and described herein.

EXAMPLE 2

With this second example, polyester foam was created utilizing method 100 disclosed herein according to select possibly preferred embodiments. Post-consumer bottle flake was loaded into a Starlinger SSP reactor. Approximately 6,500 pounds of material was loaded. This material was characterized as having 20 ppm of wood, 260 ppm of polyvinylchloride, and 990 ppm of G-Pet as contamination. In addition, the material contained 710 ppm of colored flake and 11,080 ppm of yellow discolored flake. The beginning intrinsic viscosity of this material was measured to have a range of 0.73 di/gram to 0.77 di/gram.

The reactor was heated and maintained at a temperature of 212° C. and under a nitrogen purge of 2,100 liters per hour per a period of 13 hours. The material was then unloaded and allowed to cool. The resultant material was measured for final intrinsic viscosity.

Values ranged from 1.03 to 1.17 di/gram. Prior art has shown this level of intrinsic viscosity may be suitable for low density foaming applications, as shown and described herein.

EXAMPLE 3

With this third example, polyester foam was created utilizing method 100 disclosed herein according to select possibly preferred embodiments. Post-Consumer polyester resin in the form of Bottle Flake with a measure I.V. of 1.13 dl/gram after the de-condensation reaction (produced in Example 2) was mixed with 1.0% Equicell nucleating agent and then fed into a 27 mm Listritz twin screw extruder. The Extruder had an L/D of 40:1 consisting of ten barrel sections and a three-hole strand die.

The polyester/nucleator mixture was fed into primary twin screw extruder 134 using a Brabender gravimetric feeder. Input rate to the extruder was 8 lb/hr. This rate may be low for an extruder of this size but was done so deliberately to allow residence time in the latter barrel sections to achieve needed cooling of the melt phase so that optimal viscosity for foaming could be achieved.

Using gear pump 150 with variable speed drive, blowing agent 140 was injected in the ninth barrel section. Blowing agent 140 consisted of a mixture of hexane and heptane isomers and was added to the melt at a rate of 2.5% by weight.

Primary twin screw extruder 134 was used to melt, mix, and cool the polymer mixture with the resultant foam exiting the three-hole strand die. Process conditions for this sample were:

Extruder Speed—144 rpm
Extruder Load—17%
Die Melt Pressure—142 psi
Zone 1 Temperature—538
Zone 2 Temperature—526
Zone 3 Temperature—531
Zone 4 Temperature—526
Zone 5 Temperature—527
Zone 6 Temperature—523
Zone 7 Temperature—522
Zone 8 Temperature—512
Zone 9 Temperature—502
Zone 10 Temperature—502
Die Temperature—500
Melt Temperature (measured in Zone 6)—491

Due to the difficulty in taking samples, both due to shape and small size, the density of the extruded polyester foam was determined by water displacement. The foam density was estimated to be 0.6 grams/cubic centimeter +/−0.06 grams/cubic centimeter.

This example showed the feasibility of producing low density polyester foam using 100% post-consumer bottle flake.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A method for producing a polyester foam comprising:
providing a low intrinsic viscosity raw material, the low intrinsic viscosity raw material includes between 25% to 100% of a post consumer polyester, and the post consumer polyester has an intrinsic viscosity of less than 0.8 dl/g;
increasing the intrinsic viscosity of the low intrinsic viscosity raw material via a de-condensation reaction configured to support foaming, wherein the intrinsic viscosity of the low intrinsic viscosity raw material is increased to 1.1 dl/g or greater;
creating a starting formulation including the low intrinsic viscosity raw material with the increased intrinsic viscosity;
foaming the starting formulation to create the polyester foam;
wherein, the polyester foam produced has a specific gravity of less than 0.65 g/cc.

2. The method for producing the polyester foam of claim 1 further comprising:
crystallizing the low intrinsic viscosity raw material in a crystallizer; or
pelletizing the low intrinsic viscosity raw material;
wherein the crystallizing or the pelletizing is configured to prevent the low intrinsic viscosity raw material from melting during the de-condensation reaction.

3. The method for producing the polyester foam of claim 1, wherein the low intrinsic viscosity raw material includes:
virgin polyester;
the post consumer polyester is a polyester feedstock that consists of a post-industrial waste resin; and process regrind;
wherein the post-industrial waste resin of the low intrinsic viscosity raw material consists of post-consumer scrap bottle flake.

4. The method for producing the polyester foam of claim 1, wherein the increasing the viscosity of the low intrinsic viscosity raw material via the de-condensation reaction to support foaming including increasing a molecular weight of the low intrinsic viscosity raw material by feeding the low intrinsic viscosity raw material into a solid-state reactor, or by a melt-phase de-condensation reaction with vacuum using a melt phase reactor.

5. The method for producing the polyester foam of claim 1, wherein the creating of the starting formulation including adding:
a viscosity enhancing agent configured to fine tune the viscosity of the low intrinsic viscosity raw material;
a nucleating agent configured for aiding in nucleating the low intrinsic viscosity raw material; or
combinations thereof.

6. The method for producing the polyester foam of claim 5, wherein:
the viscosity enhancing agent is a cross-linking agent;
the nucleating agent consists of a poly-flouro-ethylene particle; or
combinations thereof.

7. The method for producing the polyester foam of claim 1, wherein the foaming of the starting formulation to create the polyester foam including tandem extrusion of the starting formulation to create the polyester foam, wherein the tandem extrusion of the starting formulation to create the polyester foam including:
a primary twin screw extruder including an injection system and a blowing agent storage system configured to introduce a blowing agent into the starting formulation once the starting formulation is melted and mixed via the primary twin screw extruder, whereby a homogenous mixture exits the primary twin screw extruder; and
a secondary cooling extruder configured to cool the homogenous mixture that exits the primary twin screw extruder for giving a necessary rheology needed to the homogenous solution for successful foaming, the secondary cooling extruder is configured to give heat exchange with minimal shear heat generation, the secondary cooling extruder includes a screw configured to act as a heat exchanger for removing heat from the homogenous mixture and increasing viscosity.

8. The method for producing the polyester foam of claim 7 further comprising:
screening for solid impurities via a screen changer between the primary twin screw extruder and the secondary cooling extruder; and
pressurizing the homogenous mixture exiting the primary twin screw extruder via a gear pump between the primary twin screw extruder and the secondary cooling extruder, said gear pump is configured impart minimal additional shear heat while pressurizing the homogenous mixture;
wherein the blowing agent consists of a hydrocarbon selected from a group consisting of:
C5 hydrocarbons; and C6 hydrocarbons.

9. The method for producing the polyester foam of claim 7 further comprising forming the polyester foam using a die, wherein the die is a board die or a sheet die configured with associated finishing equipment, wherein the associating finishing equipment including:

a sizing drum;
a pull unit; and
a winder configured to create a roll of the polyester foam.

10. The method for producing the polyester foam of claim 9, wherein the pull unit is configured to pull a bubble of the polyester foam over the sizing drum and slit the bubble to open a flat sheet.

11. The method for producing the polyester foam of claim 10, wherein the polyester foam is produced as the flat sheet in a roll stock form to a thickness of at least 0.040 inches and of up to 0.375 inches thick.

12. The method for producing the polyester foam of claim 10, wherein the polyester foam is produced with a thicknesses greater than 0.5 inches and a width of greater than 6 inches.

13. The method for producing the polyester foam of claim 10, wherein:
the flat sheet is used as a thermal barrier;
the polyester foam is utilized as a wood or equivalent substitute; or
combinations thereof.

14. The method for producing the polyester foam of claim 11, wherein the flat sheet is thermoformed into a useful article, wherein the useful article being selected from a group consisting of: a clamshell; a meat tray; a plates; and a bowl.

15. The method for producing the polyester foam of claim 14, wherein the flat sheet is thermoformed into the useful article via:
unwinding the roll of flat sheet of the polyester foam;
heating the unwinded roll of flat sheet in an oven, where temperatures of the oven are controlled to soften but not melt the flat sheet of the polyester foam;
forming the heated flat sheet of the polyester foam in a forming station, where the heated flat sheet of the polyester foam is amorphous or crystallized when formed;
cutting the formed flat sheet of the polyester foam in a trim press, where skeletal waste or regrind is stored to be reused; and
packaging the useful article for sale.

16. A method for producing a polyester foam comprising:
providing a low intrinsic viscosity raw material, wherein the low intrinsic viscosity raw material includes between 25% to 100% of a post consumer polyester, wherein the low intrinsic viscosity raw material provided has an intrinsic viscosity of less than 0.8 dl/g, wherein the low intrinsic viscosity raw material includes:
virgin polyester;
the post consumer polyester is a polyester feedstock that consists of a post-industrial waste resin; and
process regrind;
wherein the post-industrial waste resin of the low intrinsic viscosity raw material consists of post-consumer scrap bottle flake;
crystallizing the low intrinsic viscosity raw material in a crystallizer, wherein the crystallizing is configured to prevent the low intrinsic viscosity raw material from melting during a de-condensation reaction;
increasing the intrinsic viscosity of the low intrinsic viscosity raw material via the de-condensation reaction configured to support foaming, wherein the intrinsic viscosity of the low intrinsic viscosity raw material is increased to 1.1 dl/g or greater including increasing a molecular weight of the low intrinsic viscosity raw material by feeding the low intrinsic viscosity raw material into a solid-state reactor;
creating a starting formulation including the low intrinsic viscosity raw material with the increased intrinsic viscosity including adding:
a cross-linking agent configured to fine tune the viscosity of the low intrinsic viscosity raw material; and
a nucleating agent configured for aiding in nucleating the low intrinsic viscosity raw material, wherein the nucleating agent consists of a poly-flouro-ethylene particle;
foaming the starting formulation to create the polyester foam including tandem extrusion of the starting formulation to create the polyester foam, wherein the tandem extrusion of the starting formulation to create the polyester foam including:
a primary twin screw extruder including an injection system and a blowing agent storage system configured to introduce a blowing agent into the starting formulation once the starting formulation is melted and mixed via the primary twin screw extruder, whereby a homogenous mixture exits the primary twin screw extruder, wherein the blowing agent consists of a hydrocarbon selected from a group consisting of: C5 hydrocarbons; and C6 hydrocarbons;
a secondary cooling extruder configured to cool the homogenous mixture that exits the primary twin screw extruder for giving a necessary rheology needed to the homogenous solution for successful foaming, the secondary cooling extruder is configured to give heat exchange with minimal shear heat generation, the secondary cooling extruder includes a screw configured to act as a heat exchanger for removing heat from the homogenous mixture and increasing viscosity;
screening for solid impurities via a screen changer between the primary twin screw extruder and the secondary cooling extruder; and
pressurizing the homogenous mixture exiting the primary twin screw extruder via a gear pump between the primary twin screw extruder and the secondary cooling extruder, said gear pump is configured to impart minimal additional shear heat while pressurizing the homogenous mixture;
forming the polyester foam using a die, wherein the die is a board die or a sheet die configured with associated finishing equipment, wherein the associating finishing equipment including:
a sizing drum;
a pull unit; and
a winder configured for creating a roll of the polyester foam;
wherein the pull unit is configured to pull a bubble of the polyester foam over the sizing drum and slit the bubble to open a flat sheet, wherein the polyester foam is produced as the flat sheet in a roll stock form to a thickness of at least 0.040 inches and of up to 0.375 inches thick;
wherein the polyester foam is produced with the thicknesses greater than 0.5 inches and widths of greater than 6 inches;
wherein, the polyester foam produced has a specific gravity of less than 0.65 g/cc.

* * * * *